No. 861,613. PATENTED JULY 30, 1907.
E. C. SMITH.
CONTROLLING DEVICE.
APPLICATION FILED APR. 14, 1905.

2 SHEETS—SHEET 1.

WITNESSES:
H. M. Gillman Jr.
Thos. Howe

INVENTOR:
Edwin C. Smith
by Porter Freeman Watson
Attorneys

No. 861,613. PATENTED JULY 30, 1907.
E. C. SMITH.
CONTROLLING DEVICE.
APPLICATION FILED APR. 14, 1905.
2 SHEETS—SHEET 2.
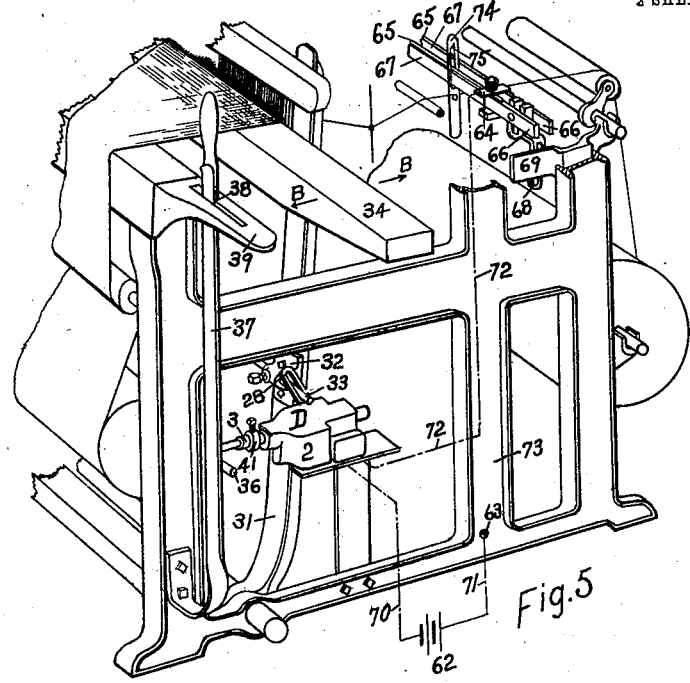
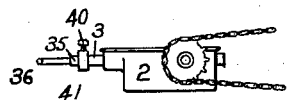
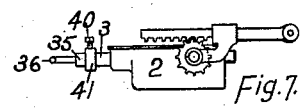
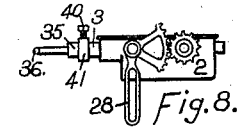
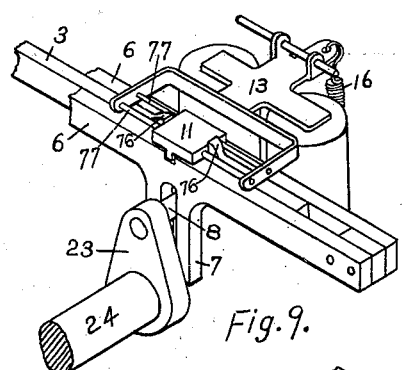
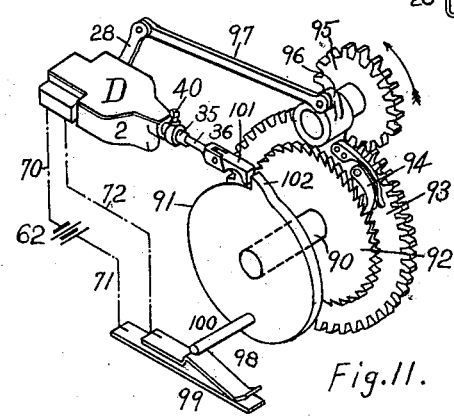
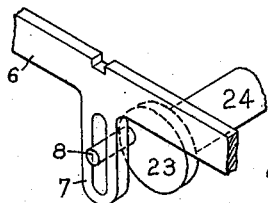
WITNESSES:
INVENTOR:

UNITED STATES PATENT OFFICE.

EDWIN C. SMITH, OF PAWTUCKET, RHODE ISLAND.

CONTROLLING DEVICE.

No. 861,613.  Specification of Letters Patent.  Patented July 30, 1907.

Application filed April 14, 1905. Serial No. 255,578.

*To all whom it may concern:*

Be it known that I, EDWIN C. SMITH, a citizen of the United States, residing at Pawtucket, in the county of Providence and State of Rhode Island, have invented new and useful Improvements in Controlling Devices, of which the following is a specification.

My invention relates to machine controllers, such as are employed with electrical detector or actuating arrangements to modify or arrest the action of the machine to which they are applied.

While this invention is applicable to various machines to which electrical controlling devices may be applied, it has, for convenience, been illustrated and described as applied to a loom equipped with a usual form of electrical warp stop motion.

Figure 1:
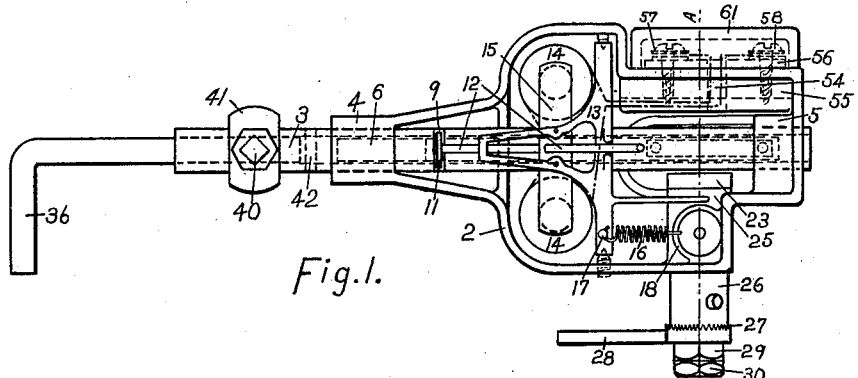
Figure 2:
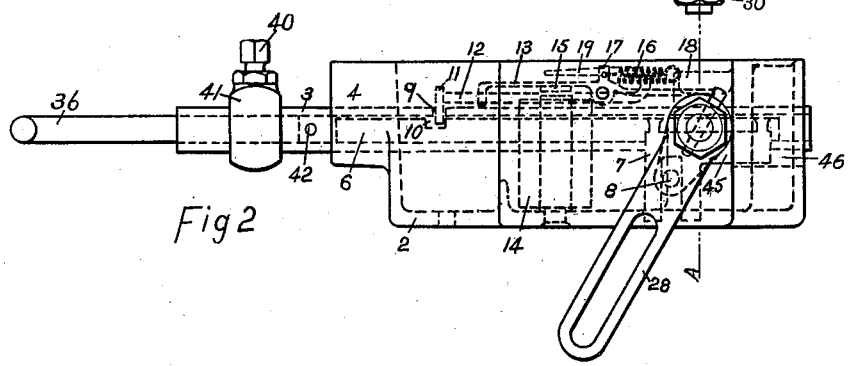
Figure 4:
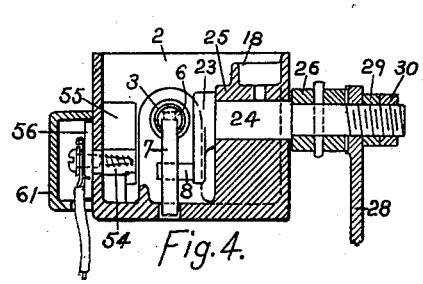
Figure 3:
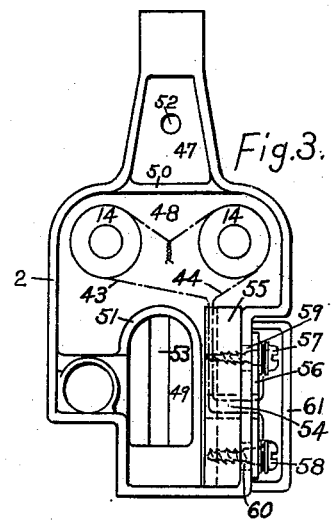

The accompanying drawings show, respectively— Figure 1, a plan view of my device; Fig. 2, a side view; Fig. 3, a plan view of the case 2; Fig. 4, a sectional view of the same on the line A—A, Fig. 1 and 2; Fig. 5, a skeleton outline of a portion of a loom, to show the mode of application, and the operation of the invention. Figs. 6, 7, 8, 9, 10, 11 & 12, modifications in the structure and mode of operation of the invention.

The body or main frame of my device is a case 2, in which is mounted a slide 3, in bearings 4 and 5. This slide is tubular and within it is a second slide 6 having a dependent arm 7, slotted to receive the crank pin 8, by which it is normally reciprocated within the first slide 3 which is normally still. In the slide 3 is a transverse slot 9 and in the slide 6 is a transverse ward 10, the relation of the two being such that the ward 10 passes and repasses the slot 9 with the normal reciprocation of its slide 6.

Suspended within the slot 9 of the slide 3 is a lock or lock plate 11, constantly within said slot, but normally out of engagement with the slide 6. This lock 11 is mounted on a rod 12 which is slidable in the pivoted frame 13, so that the said lock 11 may, when necessary, move with the slide 6. By depressing the lock 11, the slide 3 and slide 6 are connected to reciprocate as one, carrying with them the lock 11 provision for the latter's movement having been made as just previously described.

The depression of the lock 11 is effected through the electro magnets 14 14 above which is an armature 15 rigidly secured to the pivoted frame 13 which carries the slidably mounted lock 11. This frame is mounted directly on the frame or case 2, and therefore has no movement of reciprocation with the slides 3 and 6, but only that very slight vertical movement necessary for the engagement or disengagement of the lock 11 with the slide 6. Herein is a manifest advantage, for the small lock 11 is the only member having any material degree of movement, and the mode of interlocking the two slides is such that the lock 11 can be very light; and the frame that carries the lock can also be light, as no strain is brought to bear on it due to said engagement. And, because these parts are all so light, and the elements of inertia and momentum so minimized, the interlocking can be effected with a minimum of electro-magnetic energy, thus insuring the greatest certainty of action.

The lock 11 is maintained in its normal position away from the slide 6 by the spring 16, extending from the arm 17 of the pivoted frame 13 to the wall 18 at the top of the case 2. It is also maintained from turning by the reverse bend 19 in the wire to which it is attached.

The immediate agent for operating the normally reciprocating slide 6 is the crank 23, whose crank pin 8 engages the depending slotted arm 7, and whose shaft 24 moves in the bearing 25. Secured to the crank shaft 24, outside the bearing 25, is the hub 26, one face of which is cut with clutch teeth 27. Mounted likewise on the crank shaft is the arm 28 preferably slotted, having clutch teeth engaging those of the hub, (see Fig. 1), and held in engagement therewith by the nut 29 and the check nut 30.

The arm 28 is moved from some reciprocating or oscillating element, as illustrated in Fig. 5, from the lay sword 31 of the loom, and by the following instrumentalities. To the sword 31 is secured a bracket 32, and from this bracket extends a pin 33 into engagement with the arm 28. As the lay 34 moves to and fro in the direction of the arrows B—B, to beat up the filling, it oscillates the crank 23 through the arm 28, thus imparting to the slide 6 its normal reciprocation.

By means of the clutch teeth 27 of the hub 26 and those corresponding in the arm 28, the latter is adjustable to accommodate different relative locations of the lay sword 31 and the controller device.

Secured in the projecting end 35 of the slide 3 is a rod or pusher 36, the outer extremity of which abuts— or nearly so—the starting handle 37 of the loom. When the loom is in operation, the said handle 37 is held in position by engagement with the lock or notch 38. Should the lock 11 of the controller be depressed to couple the two slides 3 and 6, thus causing the reciprocation of the normally still slide 3, the pusher 36 would be caused to force out of its engagement with the notch 38, the starting handle 37 which is thereupon caused, by its own elasticity or some outside agency, to shift and stop the loom.

The loom driving devices, their belts and belt shifting or clutch shifting devices are so well known that they have been omitted in order that the drawings may not be unnecessarily obscured. It is well known that the shifting of the handle 37 starts or stops the loom, dependent on the direction of the shifting.

In some instances, the lock or notch 38 is at the front of the plate 39, in which case the action of the controller is to pull the starting handle 37 out of engagement, instead of push it. This is obviously accomplished by locating the hooked end of the pusher 36 in front of the starting handle instead of behind it, as the controller is as effective to pull as to push, and requires no special adjustment to do either.

The pusher 36 is preferably secured by the set screw 40 which passes through the collar 41 and through the shell of the slide 3. By this means a substantial fastening is secured and ready means for adjusting the position of the pusher 36 (see Fig. 2). A stop 42 prevents the pusher being set so far into the slide 3 as to interfere with the slide 6. The slide 6 is also prevented from turning by the member of which the depending arm 7 is a part. This member extends backward from the arm 7 as a fin or spline 45, which runs in the splineway 46 cut in the frame 2. (See Figs. 2 & 6.) Devices of this character are subjected to extreme vibration and in consequence the electrical connections are liable to suffer injury, the wires being jarred out of place and their insulation impaired by contact with moving parts or even by vibrating and rubbing against still surfaces. The insulation is also liable to damage from oil. To prevent trouble from such sources, the bottom portions of the magnets 14 14 and the wires connecting them, and leading to the outside of the controller, are bedded in paraffin or other similar non-conducting material. The better to effect this, the case 2 is divided into three compartments, 47, 48 and 49, (Figs. 3 & 4) by two walls 50 and 51, extending across the case. In the middle compartment are located the magnets 14 14, and in this is poured hot paraffin or a similar material which, when solidified, beds the wires and prevents vibration, and protects from oil as well. To make this protection less costly, the paraffin is mixed with some desiccated non-conductor that is less costly, as, for example, saw-dust or a like substance. Oil can reach the interior of the case 2 only from the bearings 4, 5 or 25. Whatever comes from bearing 5 will drip into compartment 47 and drain away through the opening 52; whatever comes fom bearing 4 and 25 will drain away through the opening 53, so that none can reach the compartment 48.

The wiring connections are as follows—(Figs. 1 & 3). The two leads 43 and 44 from the magnets pass from their paraffin bed to the opening 54 in a wood block 55, and through this and the side of the case 2 to the surface of a non-conducting plate 56 which is preferably fiber. Here they terminate at the binding screws 57 and 58 which also serve to secure both the plate 56 and the block 55 in place. The holes 59 and 60 in the case 2 are sufficiently large to insure against contact of the screws with the case, and are preferably bushed with non-conducting material. To prevent injury to or tampering with these terminal connections, they are protected with a cap 61, also preferably made of non-conductor.

The structural detail of my improved controller having been described, its precise mode of operation with a loom will now be indicated.

Fig. 5 indicates in outline a loom with a warp stop of usual form, and the controller connected therewith. 62 is a source of electrical energy from which one wire 70 leads directly to one terminal of the controller D, while the other 71 is grounded in the loom frame at 63. From the other terminal of the controller, a wire 72 extends to the plate 64 which engages the conducting strips 65 65 of the compound electrodes 66 66 (Fig. 5). These are of well-known form, comprising a conducting body 67 and a conducting strip 65 insulated therefrom. The bodies 67 67 are connected with the loom frame by brackets 68 and 69 and other well known connections. The electric circuit embraces, therefore, on one side, the wire 70, the controller D, the wire 72, the plate 64 and the conducting strips 65 65 which constitute the terminal for one side of the circuit; on the other side, the wire 71, the loom frame 73, and the electrode bodies 67 67 (with their supports), which bodies constitute the terminal for the other side of the circuit. On the compound electrodes are drop wires 74 (one only of which is shown) one for each thread of the warp, each normally suspended by the tension of its thread, so that it contacts only with the body of the compound electrode. The electric circuit is therefore normally open, the magnets 14 14 of the controller are inactive, and the pusher 36 is passive. When a warp thread breaks, its drop wire falls, and the inclined edge 75, engaging the conducting strip 65, gives the drop wire a tilting action that causes its engagement with both the conducting strip 65 and the body 67, thereby closing the electric circuit. This causes the action of the magnets 14 14 and, through the lock 11, the action of the pusher 36 which acts upon the handle 37 in the manner above described, to effect the stopping of the loom.

It is obvious that various structural modifications are available which fall within the scope of this invention. For example, Fig. 6, illustrates an arrangement of my device where the crank 23 is continuously rotated, as by a sprocket chain.

Fig. 7 shows an arrangement where the crank is driven by a rack and gear, and Fig. 8, where it is driven by a circular rack or segmental gear, in which instance the arm 28 is employed as before: a part of, or connected with the segmental gear.

When the driving arrangements are as in Figs. 6, 7 and 8, the crank 23 must be susceptible of a complete rotation, and in such cases the said crank and the slotted, depending arm 7 are as in Fig. 12. This arrangement has marked advantages in certain instances. First, the movement of the reciprocating parts is limited by the throw of the crank, and as that is fixed, there is no danger of any parts "dead-ending", and no damage can occur from error in adjustment. Sometimes the crank 23 is driven by a machine member having a much greater extent of movement than is required to oscillate a crank of the form in Fig. 9 within its predetermined or even possible limits of movement. In such cases, the use of a crank of fixed throw, making a complete rotation or rotations is the only practicable expedient to be employed.

In warp stop motion work, the use of a crank making several complete rotations is a manifest advantage, for it can be caused to rotate at such rate that the reciprocating slide 6 makes several reciprocations for one "beat up" of the lay. If this number of reciprocations be three, then the controlling device will act proportionally quicker than when it reciprocates only once to every "beat up" or "pick".

Fig. 9 illustrates a form of structure involving several modifications. Here the normally still slide 3 is within the normally reciprocating slide 6. The normally still slide is a rectangular bar having upward projections 76 76 which retain and carry the lock 11 as, in the structure first described, the slot 9 does. The lock 11 slides upon rods 77 77, instead of being secured to and sliding with its supporting rod. The armature frame 13 is of one piece with the armature, and its axis of oscillation is parallel to, instead of transverse of the direction of movement of the slides 3 and 6. The normally reciprocating slide 6 is preferably composed of two joined rectangular bars that flank the normally still slide 3, though it might be one bar bent to flank the said slide. From one of the bars of the slide 6 depends the slotted arm 7 which is engaged by the pin 8 of the crank 23.

Figure 10:
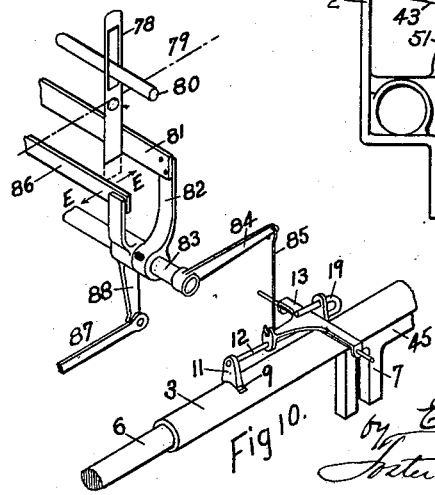

Fig. 10 shows a modification wherein the interlocking of the slide 3 with the slide 6 is controlled mechanically instead of electrically. This is a matter of importance in certain warp stop motions where mechanical rather than electrical action is preferred. A usual form of structure for such a warp stop motion comprises a drop wire 78 upheld by a warp thread 79, and retained in position by a guiding bar 80. This drop wire hangs in front of an oscillatable but normally still bar 81 which is supported by an arm 82 from the rock shaft 83. Projecting from the rock shaft 83 is another arm 84 which, through the wire 85, supports the armature lever 13. 86 is a second bar which normally oscillates on and independent of the rock shaft 83, driven by the link 87, through the arm 88, from some appropriately moving loom member. The bar 86 oscillates in the direction of the arrows E E, and to such extent that when the drop wire 78 falls, it is engaged by the oscillating bar 86, and thereby caused to shift the bar 81, depressing the lever 84 and causing the lock 11 to interlock the slide 3 with the slide 6. This arrangement is peculiarly valuable to a mechanical warp stop motion, because it removes much work from the detecting mechanism, thereby permitting the use of lighter and more sensitive mechanism, and minimizing the danger of damage, and reducing the liability to wear.

A usual arrangement for mechanical warp stop motions is to employ a "dagger" at the front of the loom, adapted to be shifted into the path of some moving element and be acted upon to effect the disengagement and action of the starting handle 37. The shifting of this dagger is effected by a train of instrumentalities which are more cumbersome, more expensive, and which impose more work and cause more wear on the detector mechanism than can the extremely light, effective device herein described.

I have hereinbefore referred to the application of this device to the modification of, as well as the controlling of—mechanical action. Fig. 11 illustrates such an application. On the shaft 90 is fixedly secured a wheel 91 and a ratchet wheel 92: also on the shaft 90 is loosely mounted the gear 93 which rotates the shaft 90 through the ratchet wheel 92 by the pawl 94. The gear 93 is driven by a gear 95 which also drives the arm 28 of my device D, through the crank 96 and link 97. In this case, the pusher 36 terminates in a pawl 101, which is hinged or otherwise adapted to yield, to permit the passage of the tooth 102 on the wheel 91. Projecting from the wheel 91 is a pin 100, adapted to engage a spring plate 98, to press it against the plate 99. 62 is a source of electrical energy, and, as in the case of Fig. 5, the wire 70 connects the said electrical source with the device D, while the wire 71 connects it with the plate 99, and a wire 72 joins the spring plate 98 with the device. The electrical circuit therefore extends from the generator 62 through the wire 70 to the device D, thence through the wire 72 to the spring plate 98, and, when said spring plate is pressed against the plate 99, through the latter plate and its wire 71 back to the generator 62. But the plates 98 and 99 are normally separated. As the wheel 91 rotates, the pin 100 is brought into contact with, and causes the engagement of the spring plate 98 with the plate 99, just as the tooth 102 has passed the pawl 101. This closes the electric circuit, and causes the action of the device D which, projecting the pusher 36, engages the pawl 101 with the tooth 102, and pushes the wheel 91, its shaft 90 and attached ratchet wheel 92, ahead, giving them an extra impulse or forward movement, other than that directly due to the intermeshing of the gears 93 and 95 and their consequent speed ratio. This novel combination is not specifically claimed in this, but is to be made the subject matter of another application.

It is obvious that further modifications of structure and arrangement are possible. The distance between the device D and the point where the electric circuit is controlled is practically unlimited, and therefore the device can be operated at long distance; as, for the controlling of power, of machinery, the operation of signals or other devices that must be controlled at long range, or from some central station.

Therefore, without limiting myself to the exact form, arrangement or application of my device, I claim:

1. The combination with a machine and controlling member thereof, of means normally still but capable of being caused to act on said controlling member, of other means normally moving, a lock mounted independently of both the normally still and the normally moving means, capable of being shifted to couple said means and of moving with them, and electro-magnetic means to shift said lock to effect said coupling.

2. The combination with a machine and controlling member thereof, of means normally still but capable of being caused to act on said controlling member, of other means, normally moving back and forth, a lock mounted independently of both the normally still and the normally moving means, capable of so coupling the two that the first is positively driven back and forth by the second and capable of moving with both the said means, and automatic means for effecting said coupling.

3. In a controlling device, the combination with a normally still and a normally moving element and means to actuate the moving element, of a movable frame, guides in the frame, a lock movable on the guides and means to shift the frame to engage the lock with the normally still and the normally moving element.

4. In a controlling device, the combination with a normally still and a normally moving element and means to actuate the moving element, of a movable frame, guides in the frame, a lock movable on the guides, and means to automatically shift the frame to engage the lock with the normally still and the normally moving element.

5. In a controlling device, the combination with a machine and its driving devices, of a controlling member, a member normally still but movable to act on the controlling member and having a slot, a lock controlled in position in one direction by said slot, but mounted independently of said normally still member, a normally moving member having a ward to receive said lock to couple it with the normally still member, means to shift the lock to enter said ward, and means to actuate the normally moving member.

6. The combination with a tubular slide 3 and pusher 36 attached thereto, of a reciprocating slide 6 within the tubular slide, said slide 6 being provided with a spline 45 engaging a splineway 46 to prevent the rotation of said slide, and with a depending slotted arm 7, and means engaging said arm to actuate the slide 6.

7. The combination with the slide 3, of the pusher 36, the collar 41, set screw 40, the reciprocating slide 6, means to interlock the two slides, and means to reciprocate the slide 6.

8. The combination with a slidable but normally still member, of a pusher adjustably secured to said member, a reciprocating member and means to drive the reciprocating member, a slidable lock and means to engage said lock with said slidable and reciprocating members to cause the positive reciprocation of the first in either direction.

9. The combination with a reciprocatable but normally still member having a notch, of a reciprocating member having a ward that travels back and forth past the said notch, a lock to engage said notch and ward, and means to actuate the lock.

10. An electro-magnetic coupling for controlling devices, comprising an armature, a pivoted frame, a lock slidable on the frame, and an electro-magnet for actuating the lock.

11. An electro-magnetic coupling for controlling devices, comprising an armature, a movable frame, a lock slidable on the frame, and an electro-magnet for actuating the lock.

12. The combination with a longitudinally reciprocating member and a longitudinally reciprocatable member, of a lock mounted outside of and independently of both, but engaging and movable with one, and means to engage it with both.

13. In a controlling device, the combination with a normally moving member, of a normally still member, a crank for moving the first member capable of making a plurality of rotations, a lock to couple the two said members, and automatic means to cause the lock to act.

14. In a controlling device, the combination with a crank, of a slide operated by the crank, a normally still slide, and means to engage the normally still slide with the crank driven slide.

15. The combination with a reciprocatable member and a reciprocating member, of locking means to couple the two movable with their reciprocation, means to normally restrain the locking means from coupling the two, and means for effecting the coupling.

16. A coupling for controlling devices, comprising a movable frame and a lock slidably mounted on said frame.

17. A coupling for controlling devices comprising a pivoted frame and a lock slidable on said frame.

18. The combination with a loom having driving devices, a member to control said devices, and a lay, of a member making a plurality of movements to each beat of the lay, and means for causing said member to act upon the controlling member upon normal action of the loom.

19. The combination with a loom having driving devices, a member to control said devices, a lay, lay sword, contact devices and detectors adapted to engage said contact devices upon abnormal action of the loom, of a crank driven by the lay sword, a member driven by the crank, a movable but normally still member, a lock to engage the driven member with the normally still member to shift the latter, means to transmit the shifting of the normally still member to the controlling member to cause its action, means to shift the lock for such engagement actuated by engagement of a detector with the contact devices, and means to restrain the detector from such engagement during the normal action of the loom.

20. The combination with a loom having driving devices, a member to control the said devices, contact devices and detectors to engage the contact devices, of a normally still member, a normally moving member, a lock mounted independently of the normally still and normally moving member, means operated by the contact devices upon the action of the latter due to engagement therewith of a detector, to engage by said lock the normally moving member with the normally still member to shift the latter, and means to transmit the action of the latter to the loom controlling member to cause its action on the driving devices.

21. The combination with a loom having driving devices, a member to control the said devices, and an electric circuit including terminals, of a normally still member, a normally moving member, a lock mounted independently of the normally still and normally moving member, electro-magnetic means to shift the lock to engage the normally moving member with the normally still member to shift the latter, means to transmit the shifting of the normally still member to the controlling member to cause its action on the driving devices, a detector which by abnormal action of the loom is caused to engage the terminals, completing the circuit and causing the action of the electro-magnetic devices, and means to restrain the detector from such engagement during normal action of the loom.

22. The combination with a loom, its lay, electrical detector device and source of electrical energy for same, of a self-contained controller device comprising a normally still member, a normally reciprocating member, a slidable lock mounted independently of said two members but shiftable to couple them, magnets for actuating said lock, means to connect said normally reciprocating member with a going part of the loom, and means to cause the action of said magnets from said electrical detector device.

23. In a stop motion for looms, the combination with a normally still member, a normally moving member and a lock normally engaging one and engageable with the other to couple the two, of detector means controlled by a thread, and means for coupling said members by said lock, actuated from the detector means.

In testimony whereof I have signed my name to this specification in the presence of two subscribing witnesses.

EDWIN C. SMITH.

Witnesses:
CHAS. A. EDDY,
GRACE W. NORTHCOTT.